United States Patent [19]

Sabacky et al.

[11] Patent Number: 4,555,387

[45] Date of Patent: Nov. 26, 1985

[54] FLASH ROASTING OF MOLYBDENUM SULFIDE CONCENTRATES IN A SLAGGING REACTOR

[75] Inventors: Bruce J. Sabacky, Westminster; Malcolm T. Hepworth, Golden, both of Colo.

[73] Assignee: Amax Inc., Greenwich, Conn.

[21] Appl. No.: 583,905

[22] Filed: Feb. 27, 1984

[51] Int. Cl.$^4$ ............................................ C01G 39/02
[52] U.S. Cl. ........................................ 423/59; 423/53
[58] Field of Search .................................. 423/59, 606

[56] References Cited

U.S. PATENT DOCUMENTS

| | | | |
|---|---|---|---|
| 1,426,602 | 8/1922 | Robertson | 423/59 |
| 3,139,326 | 6/1964 | Costello | 423/59 |
| 3,848,050 | 11/1974 | Jamal | 423/59 |

Primary Examiner—H. T. Carter
Attorney, Agent, or Firm—Michael A. Ciomek; Eugene J. Kalil

[57] ABSTRACT

A process and system are provided for flash-roasting molybdenum sulfide containing slag-forming constituents. The process comprises feeding a pneumatically suspended stream of particulate molybdenum sulfide and a mixture of fuel and oxidizing gases through a nozzle into a confined furnace chamber, the fuel gas-oxidizing gas mixture exiting from the nozzle being ignited to provide a flame thereof, the flame being maintained at a condition to provide a temperature in the furnace chamber sufficient to oxidize the molybdenum sulfide and form a volatile gas comprising molybdenum trioxide. The temperature is at least sufficient to melt the slag-forming constituents such that the slag formed is sufficiently liquid to separate from the gaseous mixture and collect at a selected portion of said chamber for removal therefrom. The resulting gases in the volatile molybdenum trioxide are caused to flow from the furnace chamber to and through a condensing chamber, the temperature of the condensing chamber being controlled to condense the volatilized molybdenum trioxide and separate it from the off-gases.

10 Claims, 6 Drawing Figures

FLASH ROASTING OF MOLYBDENUM SULFIDE CONCENTRATES IN A SLAGGING REACTOR

This invention relates to the flash roasting of molybdenum sulfide concentrate containing slag-forming constituents and, in particular, to a process for roasting molybdenum sulfide to volatile molybdenum trioxide and the separation thereof from contained slag-forming constituents and off-gases.

FIELD OF THE INVENTION

It is well known to convert molybdenite to molybdenum oxides by roasting using multiple hearth furnaces of the type variously referred to as Herreshoff, Nichols, Nichols-Herreshoff, Wedge, Skinner and other types of roasting furnaces. Conversion of molybdenite concentrates to molybdenum oxides involves the evolution of large amounts of heat. This heat must be dissipated in such a way so as to avoid prolonged retention at elevated temperatures at which molybdic oxide, or other molybdenum oxide, vaporizes, melts or fuses with other constituents, such as slag constituents.

The objective of the multiple-hearth roasting operation is to contact molybdenum sulfide and lower oxide phases of molybdenum with air at a controlled temperature below about 700° C. (e.g. about 595° C. to 650° C.) to avoid the formation of a molten phase and to produce a free-flowing low-sulfur (e.g., <0.05% S) product. In the aforementioned type of roasting, no upgrading (i.e. removal of impurities other than sulfur) occurs. Excess air is generally used to assure completion of roasting.

However, the use of excess air as a means for attaining higher production rates generally resulted in diluting the flue gas to such an extent that it customarily contained only 1 to 1.5% sulfur dioxide. Such flue gases did not lend themselves to recovery, as established systems require more than 1.5% sulfur dioxide for economic recovery. Under such conditions, the sulfur dioxide was generally wasted to the atmosphere, thus losing potential sulfur values and contributing to air pollution.

In some locations, the use of tall chimneys has been effective in controlling ground level concentrations of sulfur dioxide below generally recognized harmful limits. However, there is growing concern that this solution will not be acceptable at all locations where it may be desirable to operate a molybdenum conversion facility. Recent government legislation has placed a limit as to the quantity of sulfur dioxide which may be safely emitted at any given location.

Thus, it was not unusual to upgrade roaster off-gases by burning sulfur in the downstream acid plant as part of the overall process to recover the $SO_2$ emitted during roasting.

We have now discovered a process which utilizes flash roasting at substantially higher temperatures for converting molybdenum sulfide by oxidation to volatile molybdenum trioxide which is then separated from solids and off-gases to provide an upgraded molybdenum trioxide product and an off-gas sufficiently high in $SO_2$ to render it economically feasible for acid production.

OBJECTS OF THE INVENTION

It is thus an object of the invention to provide a roasting process for converting molybdenum sulfide to volatile molybdenum trioxide.

Another object is to provide a high temperature flash roasting process for converting molybdenum sulfide to volatile molybdenum trioxide which is thereafter condensed to provide an upgraded product of said molybdenum trioxide.

These and other objects will more clearly appear when taken in conjunction with the following disclosure, the appended claims and the accompanying drawings, wherein:

Figure 4:
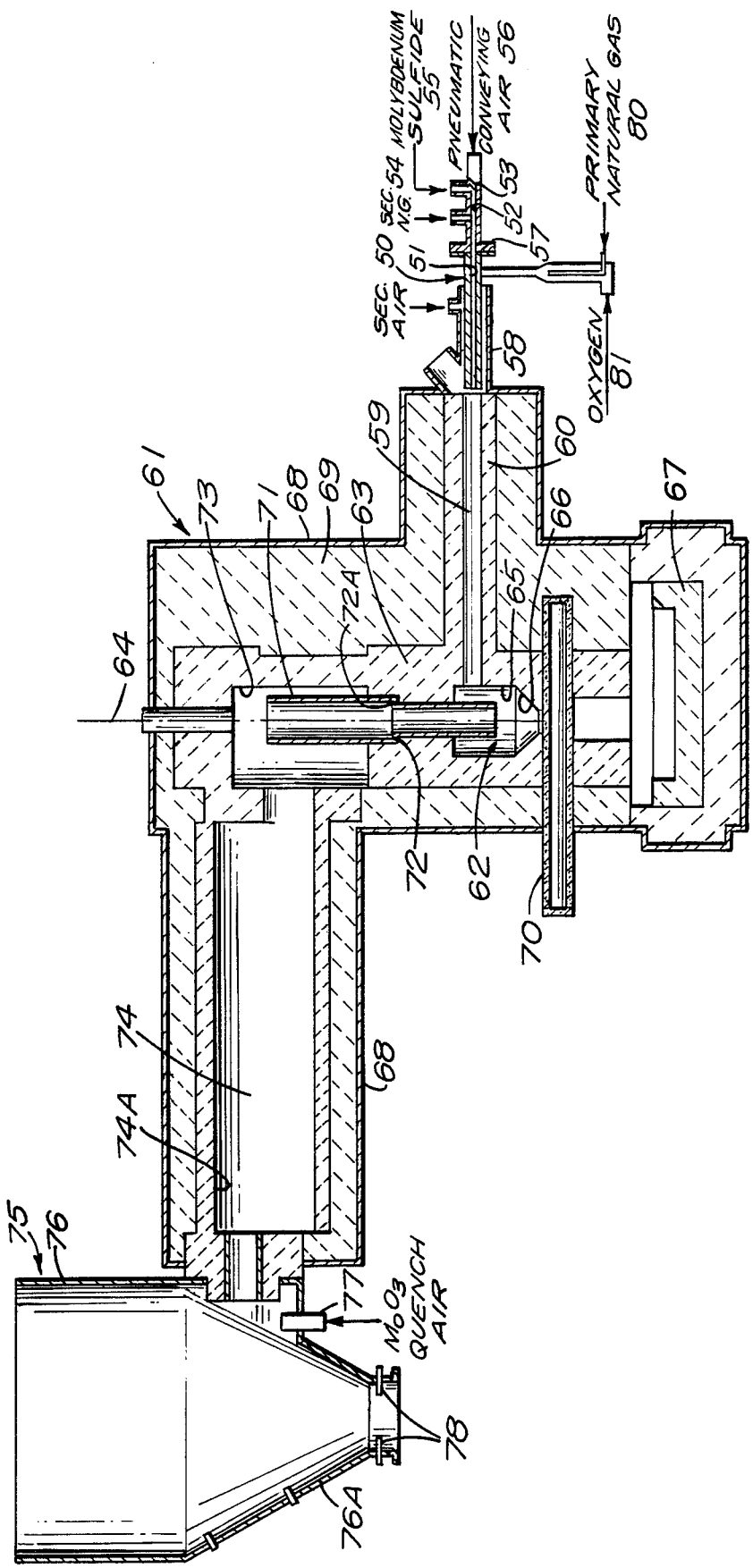
FIG. 4 depicts another embodiment of a cyclone furnace in which the vaporized molybdenum trioxide is condensed in a selected portion of the baghouse.
Figure 5:
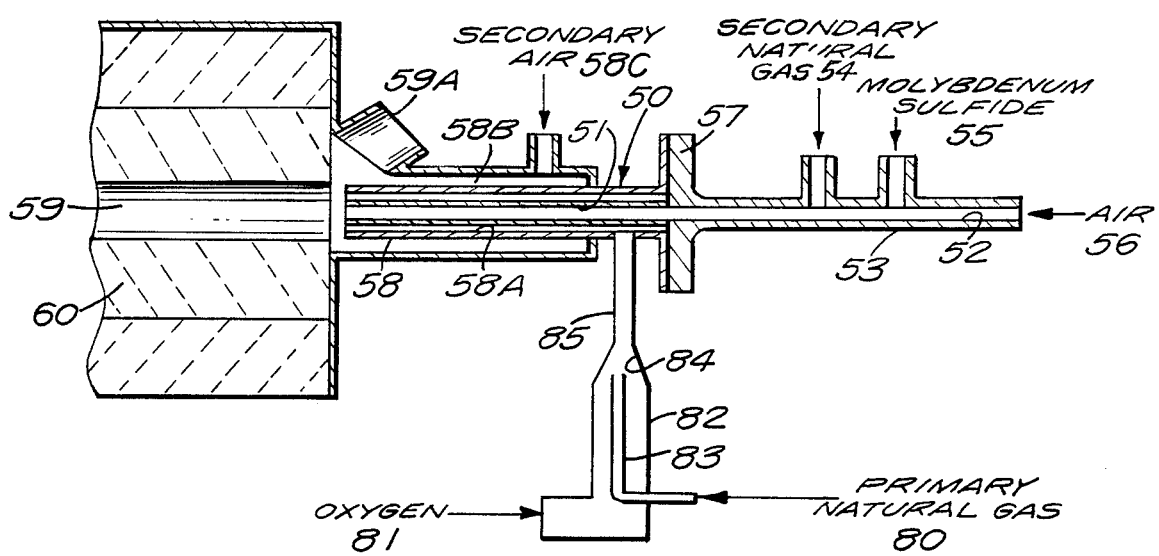
Figure 6:
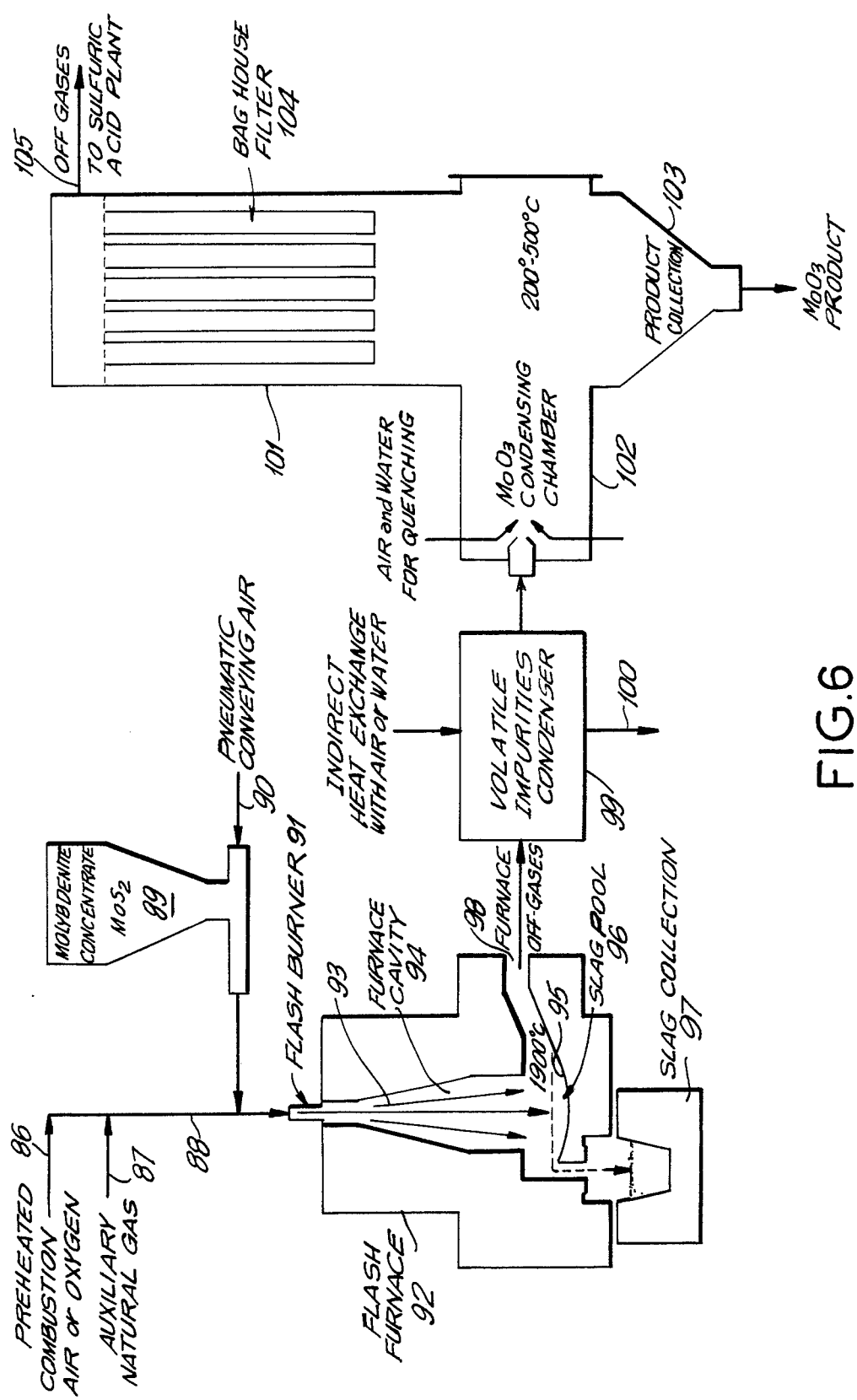

FIG. 5 is an enlarged portion of the feed end of FIG. 4 showing the relationship of the molybdenum sulfide feed and the feeding of the various gases relative to the torch assembly coupled to the cyclone furnace; and FIG. 6 is a preferred embodiment of the invention in which a flash furnace utilizes a slag pool towards which the ignited stream of molybdenum disulfide is directed downwardly while minimizing direct contact with the wall of the furnace.

SUMMARY OF THE INVENTION

The process of the invention is directed to the flash-roasting of molybdenum sulfide containing slag-forming constituents wherein the molybdenum sulfide is oxidized to molybdenum trioxide which is separated from the slag in the volatile state. The process comprises feeding a pneumatically suspended stream of particulate molybdenum sulfide and a mixture of fuel and oxidizing gases through a nozzle into a confined furnace chamber, the fuel gas-oxidizing gas mixture exiting from the nozzle being ignited to provide a reaction flame. The flame is maintained at a condition to provide a temperature in the furnace chamber sufficient to effect thermal oxidation of molybdenum sulfide in an oxidizing environment to form a volatile gas comprising molybdenum trioxide.

Preferably the temperature conditions in the furnace are such that a slag is formed from slag-forming constituents in the molybdenite, the slag being sufficiently liquid so that it collects in a pool in the furnace. An advantage of having a slag pool is that the oxidizing stream can be directed against the slag pool to collect additional solids, with the gaseous molybdenum trioxide leaving the chamber with off-gases.

In one embodiment, the reacted mixture, including the volatile molybdenum trioxide, may be passed through a condensing chamber, the temperature of which is controlled to above the condensing temperature of the volatilized molybdenum trioxide and below the volatilization temperature of volatile metal impurity species present, such as metal oxide impurities, e.g. metal molybdates, to effect separation of said volatile molybdenum trioxide from said metal impurities.

The separated gaseous molybdenum trioxide and the off-gases (carbon oxides, water, nitrogen, excess $O_2$ and $SO_2$) are then conducted to a condensing chamber to effect condensation of the molybdenum trioxide and the recovery thereof, while the off-gases pass through this chamber, the off-gases being subsequently treated to recover the $SO_2$ in any desired form, such as sulfuric acid in a sulfuric acid plant.

In another embodiment, the pneumatically suspended stream of particulate molybdenum sulfide and a mixture of fuel and oxidizing gases are fed through a nozzle centrifugally into a cyclone furnace to provide a spinning action of the stream about the longitudinal axis of the cyclone furnace and adjacent the inner walls of said furnace. Care should be taken in spinning the stream along the furnace wall to minimize erosion of the wall. By feeding the stream mixture centrifugally into the furnace adjacent the walls at a temperature at which a slag forms from the suspended gangue particles in the stream, slag collects on the walls of the furnace by virtue of the centrifugal action of the spinning stream and flows by gravity down the walls to a slag pool for subsequent removal thereof.

DETAILS OF THE INVENTION

The concentrate to be roasted generally has a fine particle size (minus 200 mesh), although coarser material is also amenable to flash roasting. It is fed by means of a sealed conveying device to a preheater if the concentrate contains moisture and/or flotation oil (however the preheating step may be omitted if the concentrate is free flowing). The conveyor can act as a metering device to control the required combustion air flow rate. The combustion air and free-flowing concentrate are then educted into a burner assembly constructed to produce turbulent mixing. Preheating of the combustion air to a temperature of up to 600° C. may be desirable but is not necessary if the burner configuration is designed to reflect the heat of combustion of the burning sulfide/air mixture back to the flame front. If oil is present in the concentrate, it is preferably volatilized in the prior preheater. The reductants to be oxidized consist of oil vapor, molybdenite, and any other included metal sulfides and carbonaceous matter. The stoichiometry of the air/reductant ratio is not critical and can be adjusted to yield an off-gas suitable for incorporation into the downstream acid plant, typically at 6 percent $SO_2$ on a dry basis. The determination of the air/reduction ratio is conventional and is well known to those skilled in the art.

The flame front emerging from the burner or multiple burner assemblies is directed in one embodiment into a refractory-lined cyclonic enclosure (FIGS. 1 and 2) to achieve an interior temperature in excess of 1300° C. which must be sufficiently high to cause the most refractory of the gangue constituents (silica and clays) to form a free-flowing slag which is then continuously removed. A typical temperature required for the slag to be free-flowing is of the order of 1600° C., but this temperature may be higher or lower (within 100° to 200° C.), depending on the composition of the slagging components. Generally speaking, the temperature may range from about 1600° C. to 1800° C. Control of the air-to-sulfide stoichiometry and the heat exchange between the off-gas and furnace enclosure to the incoming air may be resorted to achieve the upper temperature range, or else auxiliary fuel or oxygen enrichment may be used, whichever is most appropriate for the installation.

As will be appreciated, once flash roasting has begun, the flow of fuel gas may be shut off or decreased substantially since the flash roasting, once the desired temperature has been reached, is substantially self-sustaining by virtue of the large amount of heat generated autogeneously due to the oxidation of the sulfide in the furnace.

In the cyclonic type furnace the burner is located tangentially on one wall or on the center line at one end. Where the burner is located at the center, all or a portion of the combustion air (as distinguished from the pneumatic air for conveying the solids) is given a rotational component to impart a spinning action to the gas/solid combustion mixture prior to entry into the burner chamber.

Figure 1:
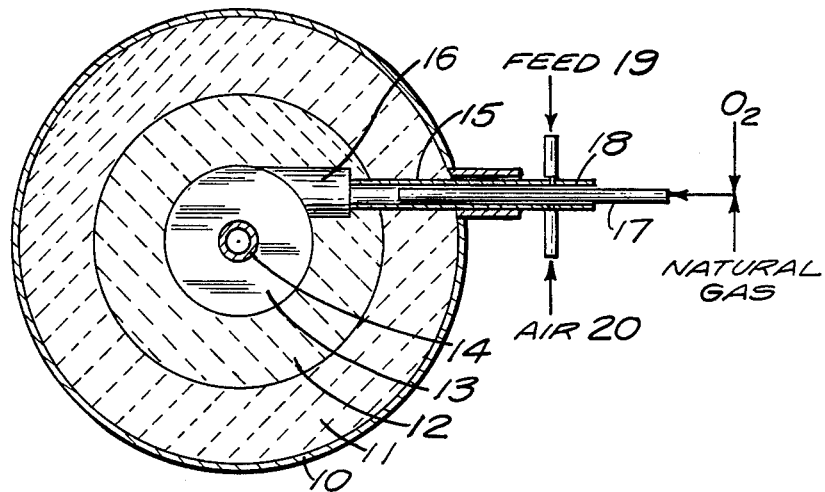
FIG. 1 is a plan view in cross section of one embodiment of a cyclone furnace for carrying out the flash roasting process of the invention.

One embodiment of a burner is shown in the plan cross-sectional view of FIG. 1 which is part of the cyclone furnace. The cyclone furnace comprises a cylindrical steel shell 10 (about 18 inches in diameter) surrounding a cast insulating refractory 11 which in turn surrounds a cast high temperature furnace wall 12 which defines within it a cyclone furnace cavity 13. The cyclone cavity may be about 6 inches in diameter. A vortex finder 14 of tubular mullite is provided extending downwardly into the furnace cavity (note FIG. 2). The torch or burner 15 extends through the furnace walls and is disposed tangentially to the cavity as shown, the torch being coaxially coupled to a two-inch diameter cyclone entrance 16. The torch body 17 extends coaxially rearward of the torch and is of tubular construction for receiving oxygen or air and fuel gas (e.g. natural gas) which is fed mixed to the torch head or nozzle.

The torch body passes substantially concentrically through a tubular member 18 through which pneumatically-conveyed feed 19 (i.e., molybdenum sulfide) is fed along with air 20. The torch and feed assembly is so arranged relative to the cyclone cavity as to provide a spinning action to the particulate solids and gas mixture about vortex finder 14 and adjacent the cylindrical walls of the furnace.

Figure 2:
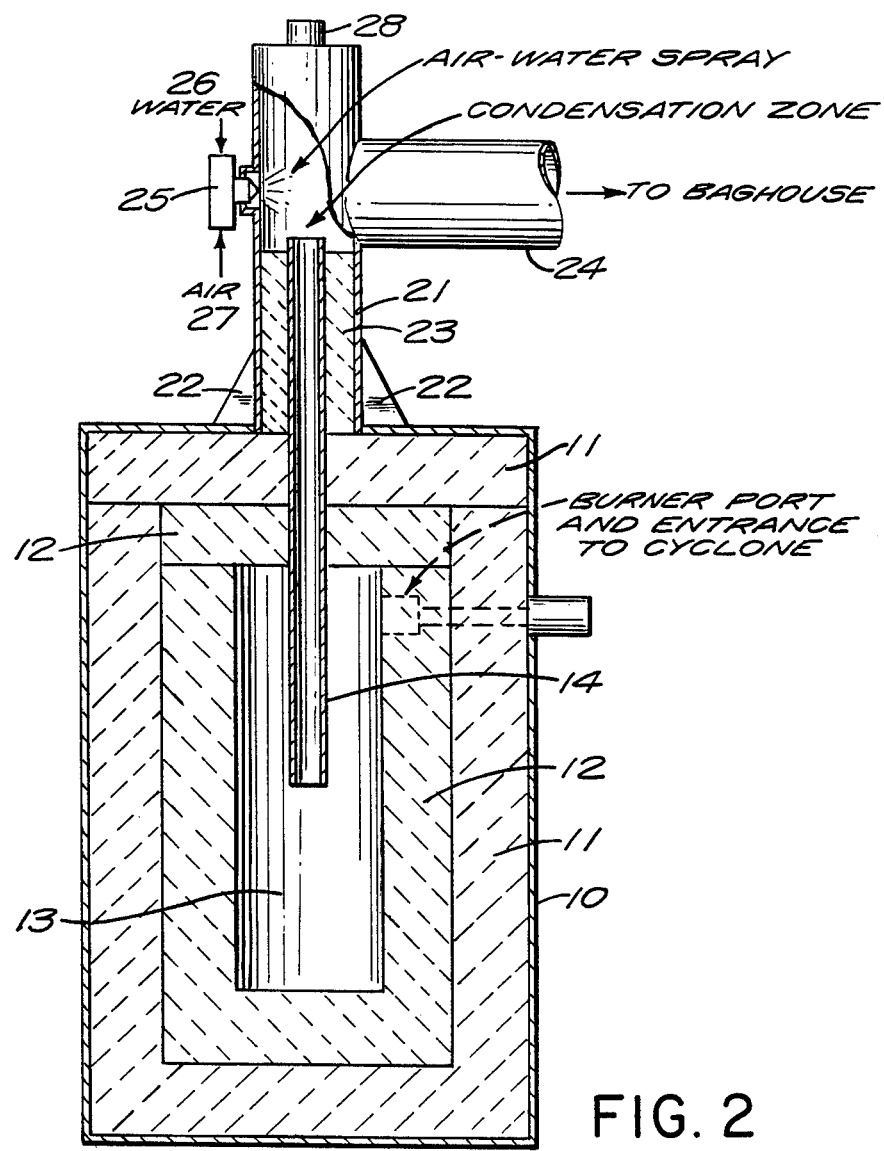
FIG. 2 is a cross section in elevation of a cyclone furnace of the type shown in FIG. 1.

FIG. 2 is a vertical cross section of the cyclone furnace in which the same numerals are used for the same parts as described for FIG. 1. As will be noted, the vortex finder 14 extends downwardly about one-half of the depth of cavity 13. A stainless steel pipe 21 is coupled to the top of the furnace via structural webs 22, the pipe surrounding insulation 23 being in the form of a ceramic blanket. The pipe is contiguous with a horizontally disposed condenser 24 through which the reacted products flow and in which condensation occurs. To effect condensation, a water-atomizing nozzle 25 may be employed, a mixture of water 26 and air 27 being fed to the nozzle. A sight port 28 is provided as shown.

Thus, depending upon whether tangential entry or axial entry is used for the combustion chamber, the emergent gases consisting of molybdic trioxide vapor, oxides of carbon ($CO_2$), $H_2O$, $N_2$, excess $O_2$ and sulfur ($SO_2$) and certain volatile metal oxides (e.g., PbO) are separated from the gangue components of silica, clays, and non-volatile metal oxides (e.g., $Fe_2O_3$). The spinning action in the presence of the high-temperature gas phase causes coalescence and agglomeration of the fine gangue particles which are caused to move under the influence of centrifugal forces to the walls of the chamber and are removed as a liquid phase. The slags so formed are collected continuously or semi-continuously from the chamber walls by gravity flow down the walls to the bottom of the furnace into a slag pot. By operating at a sufficiently high temperature ($>1300°$ C.), the volatility of molybdenum trioxide is sufficiently high so that the collected slags generally contain less than 5 percent by weight molybdenum and a total of less than 1 percent of the molybdenum fed. Operation and conditions suitable for acid plant operation (i.e., typically 6 percent $SO_2$ or higher) assures sufficiently oxidizing conditions in order to avoid the formation of non-volatile suboxides of molybdenum. However, the residence time in the burner chamber and the turbulence in the burner itself combined with the particle size of the feed should be controlled to assure complete combustion of the molybdenum sulfide to the volatile trioxide. Also the flow along the furnace walls should be controlled to minimize erosion as much as possible.

The furnace compartment may be operated at a draft sufficient to effect the desired flow through the furnace. This may be controlled by a draft fan located downstream in the circuit, generally at the sulfuric acid plant. The vapors from the furnace may be passed through a downstream partial condenser operating at temperatures ranging from 850° to 950° C. However, this is not essential. The partial condenser serves to remove lead, copper, zinc, and other basic and amphoteric metal oxide compounds which form liquid molybdates, the condenser operating at a temperature above the condensation or desublimation temperature of molybdic trioxide but below the temperatures at which the metal molybdates exert a significant vapor pressure. Various condenser designs may be employed. Temperature control of the onstream partial condenser can be obtained by the aspiration of finely dispersed water sprays directed from the walls, or via other forms of heat exchange.

Figure 3:
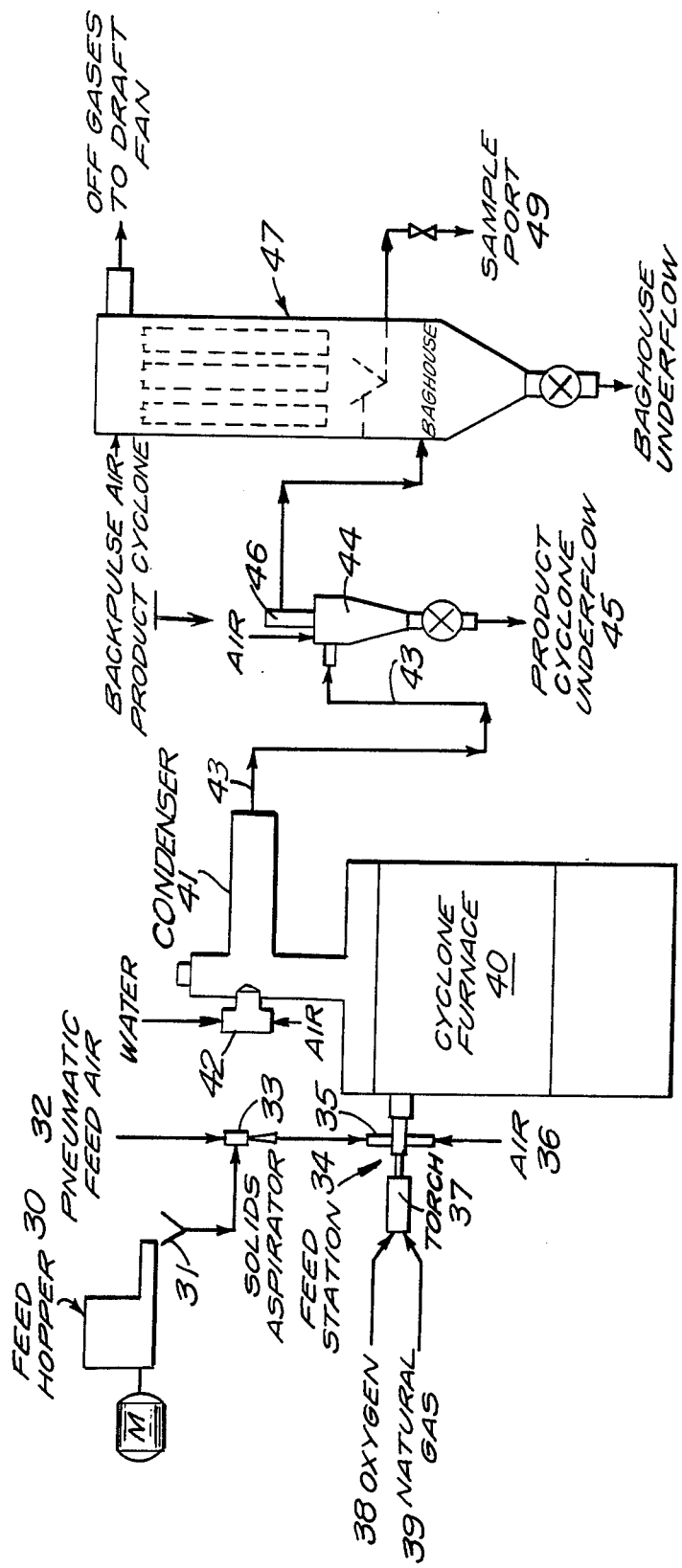
FIG. 3 is a schematic in the form of a flow sheet showing the various elements of the apparatus employed in carrying out the invention.

If the heavy metal impurities of the feed concentrate are sufficiently low and the product quality specifications permit, then the partial condenser can be by-passed. Subsequently, the flue gases enter a total condenser for molybdic trioxide (FIG. 3). In this condenser, finely dispersed water sprays may be employed to impinge downstream to the flow of gases, thereby dropping the temperature to the range of 500° to 550° C. This temperature is well above that for the condensation of acid mist on the oxide product but is well below that for the desublimation of the molybdic oxide to produce a solid phase of very low vapor pressure. The effluent gas which may consist of flue gases of about 6 percent $SO_2$ (on a dry basis), water vapor, some excess oxygen, and oxides of carbon in a predominantly nitrogen stream is directed to a gas cyclone. The cyclone may be operated at a temperature of about 500° C., e.g. about 400° C. to 600° C., and is the primary product collector for the condensed solids. The product is continuously collected into a sealed bin and removed via a star valve or other sealing device to a densifier which is vented to the primary flue gas stream. Upon densifying the product, any interstitial sulfur-bearing gases are removed so that the product has a residual sulfur content of less than 0.05 percent.

The cyclone overflow may be cooled by further water injection or heat exchange to a flue system of electrostatic precipitators and baghouse where the finer particles of sublimated product are removed. This product, which represents less than 10 percent of the feed, may not meet sulfur specifications but is an ideal feed to a chemical plant, or alternatively, it can be blended with the feed concentrate and recycled.

The lowering of the temperature between furnace and baghouse may be optionally achieved by heat exchange or by vaporization of water. In the former instance, some of the heat can be used either to preheat the combustion air to the burner or for other process heat requirements. In the latter, the flue gases will generally be close to saturation and thus require less process water in the high energy scrubbers prior to the acid plant. The water added upstream can be removed subsequently by the acid plant condenser.

The aforementioned processing steps will be clearly apparent from the flow sheet of FIG. 3 which depicts a motor-driven feed hopper 30 which feeds the material to be roasted to a collecting zone 31 from which the material is aspirated via aspirator 33 which is actuated by means of pneumatic feed air 32, whereby the particulate solids of molybdenum sulfide are pneumatically suspended and conducted to cyclone furnace feed station 34 comprising solids inlet port 35 and air inlet port 36. The mixture is fed to the furnace coaxially along the torch axis, the torch 37 having fed to it oxygen (or oxygen enriched air) 38 and natural gas 39.

The cyclone furnace 40 is shown schematically, the fuel gas, oxygen and the pneumatically suspended material being fed in spinning fashion as described for FIG. 1, the products of reaction being drawn off through condenser 41 into which a water-air mixture is sprayed via atomizer 42 to control the temperature in condenser 41. The reaction products are conducted via line 43 to cyclone condenser 44, the temperature of which is below the sublimation temperature of molybdenum oxide. The molybdenum trioxide condenses and provides a product underflow 45, while the gases with entrained solids are drawn off the top 46 of the condenser and sent to baghouse 47 where the finer particles of the sublimated product are removed. The baghouse product represents less than 10% of the feed and may be used as a feed to chemical plants or alternatively, it may be blended with the feed concentrate and recycled.

The off-gases containing carbon oxides, $H_2O$, $N_2$, excess $O_2$ and $SO_2$ are drawn off via a draft fan and subsequently treated to recover the $SO_2$ either as sulfuric acid or other forms of sulfur-containing products. As will be noted, the baghouse is provided with a sample port 49 for removing samples for analysis.

As illustrative of the invention, the following example is given:

EXAMPLE

Molybdenum concentrate containing slag-forming constituents, some moisture and residual flotation oil is fed to a preheater maintained at a temperature of about 300° C. to remove the moisture and oil in order to assure a free-flowing concentrate, the particle size of the concentrate being less than 28 mesh (U.S. Standard) and preferably less than about 100 mesh. The resulting free-flowing concentrate is fed via a feed hopper 30 (FIG. 3) to collecting zone 31 where the concentrate and oil vapors are aspirated into the system by feed air fed pneumatically to aspirator 33 at a pressure of about 75 lbs/in$^2$ and a flow rate of about 200 grams per minute. The feed material in the suspended form is fed to the inlet port of cyclone furnace 40 coaxial with torch 37 to which oxygen and natural gas are fed, the oxygen pressure being about 40 lbs/in$^2$ and natural gas at 20 lbs/in$^2$, the ratio of oxygen to fuel gas being adjusted to provide a temperature within the cyclone following ignition of about 1600° C.±200° C., taking into account the heat of reaction of the sulfide material. The aforementioned data are based on using room temperature oxygen. Preferably the gas would be preheated in which case the data would vary accordingly. Adequate oxygen is provided to provide an off-gas composition of between 6 to 12% $SO_2$.

Following reaction in the cyclone furnace, the gaseous products, including sublimed molybdenum trioxide, are drawn off via a draft fan capable of operating at a flow rate of about 100 cubic feet/min, the gaseous products and any entrained solids being drawn through a condenser to cyclone 44. The temperature of the condenser is 400° C. to 600° C.

The product is removed as underflow 45 and has a contained $MoO_3$ analysis of about 98 to 99.9% and a sulfur content of less than about 0.05%.

The off-gases which comprise 66% $N_2$, 7% $CO_2$, 9% $O_2$, 5% $SO_2$ and moisture making up the balance of about 13% are passed to baghouse 47 where entrained solids are removed and the gases then passed on to $SO_2$ recovery. A materials balance showed that about 99.5% of the originally contained molybdenum was recovered as $MoO_3$.

FIG. 4 shows another embodiment of the invention that does not require a separate condenser for condensing the purified molybdenum trioxide vapor, the condensation being advantageously carried out in the baghouse.

Thus, referring to FIGS. 4 and 5, the same numerals being used for the corresponding elements, a burner assembly 50 is depicted having a channel 51 passing centrally therethrough which is coextensive and coaxial with a channel 52 of the feed end portion 53 of the assembly, the feed end portion 53 having inlets or ports 54, 55 for receiving secondary natural gas and particulate molybdenum sulfide, respectively. Air is fed to end 56 of feed channel 52 to pneumatically suspend the particulate sulfide and to mix with the secondary natural gas entering port 54. The term "secondary" is used to indicate that this is not the main gas supply, but rather is auxiliary with the main or primary supply.

The feed portion 53 is flange-connected (57) to the burner assembly 50, the torch end portion 58 of which extends to the mouth of combustion and vaporization chamber 59. The vaporization chamber comprises a tubular or shell lining 60 of high temperature refractory, e.g., alumina, said chamber being a part of the cyclone furnace assembly 61 and being in communication with the cyclone furnace 62 which is encompassed within walls of high temperature refractory 63, e.g., alumina, or magnesite, etc.

The cyclone furnace is disposed vertically along its longitudinal axis 64 and comprises a substantially cylindrical chamber 65 having a conically configurated bottom 66 with a central opening through which liquid slag formed during the reaction flows into receptacle 67 at the bottom of the cyclone furnace assembly, the assembly being encased in an outer steel shell 68 having within it an insulation comprising a ceramic blanket or other similar fibrous ceramic 69, the insulation extending throughout the furnace assembly.

A globar heating unit 70 of silicon carbide comprising several rods of silicon carbide electrically heated may be employed to assure fluidity of the slag formed at the walls of the furnace and which flows by gravity to the bottom of the cyclone chamber.

A tube of mullite 71, or other suitable refractory, is located along the longitudinal axis of the cyclone furnace, the tube being stepped at 72 to provide an annular shoulder which is supported by a corresponding annular shoulder on a reduced portion 72A of the cyclone furnace extending upwardly from cyclone chamber 65.

Thus, the tube provides a passageway through which gaseous products, including molybdenum trioxide, are drawn by a downstream fan located at the baghouse, the gaseous products being drawn into upper furnace chamber 73 and thence through a mullite-lined (74A) chamber 74 containing a ceramic packing of either rings or saddles, the temperature of the chamber being maintained above the volatilization temperature of molybdenum trioxide and below the volatilization of volatile metal impurities, thereby to condense metal impurities, e.g., metal oxides and molybdates, and separate them from the molybdenum trioxide vapor.

Chamber 74 (referred to as the partial condensing chamber) may comprise two separably operable chambers in parallel so that when one is in use, the other is being cleaned to get it ready for the next cycle in place of the first one. The mullite liner as shown is surrounded by a ceramic packing enclosed within the continuation of the outer steel shell 68.

Chamber 74 extends horizontally to and communicates with baghouse 75 (lower fragment shown only) comprising an outer shell 76 and a conically configurated bottom 76A into which air is blown via nozzle 77 to quench molybdenum trioxide vapors entering the baghouse and effect the condensation thereof.

The condensed purified trioxide is collected at the bottom which is closed and discharged at various periods through nozzles 78. Off-gases are drawn upwardly through the baghouse via a draft fan not shown.

Referring back to FIG. 5, the manner in which the particulate molybdenum sulfide is fed will be apparent from the following description.

Air is fed into the end 56 of the feed end portion 53 of the assembly to pneumatically suspend particulate molybdenum sulfide entering port 55, secondary natural gas, if desired, being fed via port 54. The suspension is fed through channel 52 which is contiguous with burner channel 51. The suspension thus enters burner channel 51 and enters the mouth of combustion and vaporization channel 59 after being emitted from nozzle 58 of burner assembly 50.

In the meantime, primary natural gas 80 and oxygen 81 are fed to mixing chamber 82, the natural gas being fed via nozzle 83 within the chamber, with oxygen flowing over and around the nozzle to provide mixing at the conical end portion 84 of mixing chamber 82. The mixed gases flow via tube connection 85 coupled to the burner assembly into annular chamber 58A which surrounds channel 51. The mixture of oxygen and natural gas pass along annular chamber 58A and to the nozzle at the end thereof where the gases are ignited to provide an annular flame surrounding the pneumatically suspended stream of particulate molybdenum sulfide emitted from the nozzle at the mouth of combustion chamber 59. The flame ignites the sulfide stream in the presence of oxygen to start the flash roasting thereof which is completed in the cyclone furnace as shown in FIG. 4. If desired, additional oxygen may be added to assure complete oxidation of the sulfide.

This is shown clearly in FIG. 5 which depicts an annular chamber 58B surrounding burner assembly 50 and closed at one end and opening at its other end into the mouth of combustion channel 59, a burner view port 59A being provided to observe the flame and the suspended powder entering combustion channel 59. Secondary air is added via port 58C which flows through annular chamber 58B into combustion channel 59 to provide additional oxidation, if necessary.

As will be clearly apparent, the invention also provides a system for converting metal compounds into a volatilized state for the subsequent purification thereof or for the oxidation thereof to a volatile reaction product. Thus the system is particularly useful in the flash sublimation of $MoO_3$ as part of a purification process.

Thus, another embodiment of the invention is directed to a system for the flash vaporization at elevated temperatures of a particulate metal compound containing impurities to produce a substantially purified product therefrom, the system comprising, a furnace having a confined chamber therein, with inlet and outlet means, means for feeding a pneumatic suspension of a metal compound into the chamber, including means for concurrently feeding a mixture of fuel and oxidizing gases thereto, means for maintaining a flame in the confined chamber following ignition of the fuel gas and for providing a volatilized reaction product produced from the metal compound including off-gases formed in said chamber. The system may include, though not necessary, a first condensing means coupled to the outlet of the furnace for selectively condensing impurities while maintaining said reaction product volatile, and a second condensing means coupled to the first condensing means for receiving the separated volatile reaction product including off-gases, the second condensing means being maintained at a temperature below the volatilization temperature of the reaction product, whereby the reaction product is condensed and separated from said off-gases. A baghouse is provided for separating the off-gases from said condensed reaction product, and means for conducting the off-gases from the baghouse for the further treatment thereof is provided where necessary.

A preferred system for carrying out the invention is that shown in FIG. 6. This system avoids the erosion problem of the cyclone furnace by employing a furnace chamber in which a slag pool is formed in the hearth against which the flame is directed. Thus, the slag-forming solids in the flame enter the slag pool while the off-gases and the $MoO_3$ vapors are drawn off and optionally passed through a condenser to remove condensable impurities, the volatile molybdenum trioxide being then passed to the baghouse where the vapors are condensed and separated from the off-gases.

The system shown schematically in FIG. 6 depicts preheated combustion air or oxygen 86 (500° C.) and natural gas 87 being fed to line 88 to which is also being fed molybdenite concentrate 89 suspended pneumatically in air via means 90, the mixed stream entering flash burner 91 of flash furnace 92.

The system feed and gases are ignited to provide a flame 93 in furnace cavity 94, the flame being directed against hearth 95 containing slag pool 96. The slag pool accumulates during flash roasting by virtue of the slag-forming constituents present in the molybdenite, the slag over-flowing into collector 97.

The molybdenite is oxidized to $MoO_3$, the temperature in the furnace being controlled at about 1700° C. The off-gases and vapors of $MoO_3$ leave the furnace at 98 and depending upon the amount of impurities present optionally passed through condenser 99 maintained at about 800° C., whereby high melting impurities are condensed and removed at 100 and the vapors of $MoO_3$ passed to baghouse 101.

The baghouse has a condensing chamber 102 which the $MoO_3$ vapors enter and are cooled and condense (200° to 500° C.), the condensed oxide accumulating in product collector 103, with the off-gases passing through baghouse filter 104 and thence to the sulfuric acid plant via line 105.

This system is advantageous over the cyclone furnace in that the furnace walls are not impinged upon directly by the flame and thus are protected against accelerated erosion.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for flash-roasting molybdenum sulfide containing slag-forming constituents which comprises, feeding a pneumatically suspended stream of particulate molybdenum sulfide and a mixture of fuel and oxidizing gases through a nozzle into a confined furnace chamber, said fuel gas-oxidizing gas mixture exiting from said nozzle being ignited to provide a flame thereof, maintaining said flame at a condition to provide a temperature in the range of 1600° C.±200° C. to about 1800° C. in said furnace chamber sufficient to oxidize said molybdenum sulfide to molybdenum trioxide and thereby sublime said oxide, and to melt slag-forming constituents contained therein, collecting liquid slag formed in said chamber, causing the resulting gases and any suspended solids including the sublimed molybdenum trioxide to flow from said furnace chamber to and through a condensing chamber, the temperature of said condensing chamber being controlled to above the condensing temperature of said sublimed molybdenum trioxide but below the volatilization temperature of volatile impurity species present and thereby effect a separation of the molybdenum trioxide from said impurities, and then condensing and recovering the separated gaseous molybdenum trioxide as solids while removing off-gases comprising carbon oxides, $H_2O$, $N_2$, excess $O_2$ and $SO_2$.

2. The process of claim 1, wherein the off-gases are treated to recover the $SO_2$ therefrom in the form of sulfuric acid.

3. The process of claim 1, wherein the temperature in the condensing chamber immediately following reaction in the furnace chamber ranges from about 850° C. to 950° C.

4. The process of claim 3, wherein the temperature in the chamber for condensing molybdenum trioxide ranges from about 400° C. to 600° C.

5. The process of claim 1, wherein the pneumatically suspended stream of particulate molybdenum sulfide is fed through the nozzle into a cylindrically shaped cyclone furnace such as to apply a spinning action to the stream and cause gangue particles to melt and deposit on the cylindrical wall of the furnace and flow down by gravity to the bottom thereof.

6. A process for flash-roasting molybdenum sulfide containing slag-forming constituents which comprises, feeding a pneumatically suspended stream of particulate molybdenum sulfide and a mixture of fuel and oxidizing gases through a nozzle into a confined chamber having a hearth for supporting a slag pool, said fuel gas-oxidizing gas mixture exiting from said nozzle being ignited to provide a flame thereof, directing said flame towards the hearth and maintaining said flame at a condition to provide a temperature in said chamber in the range of 1600° C.±200° C. to about 1800° C. to oxidize said molybdenum sulfide and form sublimed molybdenum trioxide, the temperature being at least sufficient to melt said slag-forming constituents and cause the slag formed to collect as a pool in the hearth, causing the resulting gases including the volatile molybdenum trioxide to flow from said furnace to and through a condensing chamber at a temperature ranging from about 850° C. to 950° C. and above the condensation temperature of sublimed molybdenum trioxide but below the volatilization temperature of volatile impurity species present and thereby effect separation of said impurity, then passing the sublimed molybdenum trioxide to a condensing chamber maintained at a temperature ranging from about 400° C. to 600° C., the temperature of said condensing chamber being controlled to effect condensation of the volatilized molybdenum trioxide and separate it from the off-gases, and removing the off-gases comprised of carbon oxides and $SO_2$.

7. The process of claim 6, wherein the off-gases are treated to recover $SO_2$ therefrom.

8. The process of claim 6, wherein the off-gases are treated to recover the $SO_2$ therefrom as sulfuric acid.

9. The process of claim 6 wherein the temperature in the furnace chamber is controlled over the range of about 1600° C. to 1800° C.

10. The process of claim 9, wherein the temperature in the chamber for condensing molybdenum trioxide ranges from about 400° C. to 600° C.

* * * * *